Feb. 3, 1959     F. P. ZIERDEN     2,872,246
HOSE REEL MOUNTING
Filed April 4, 1957     2 Sheets-Sheet 1
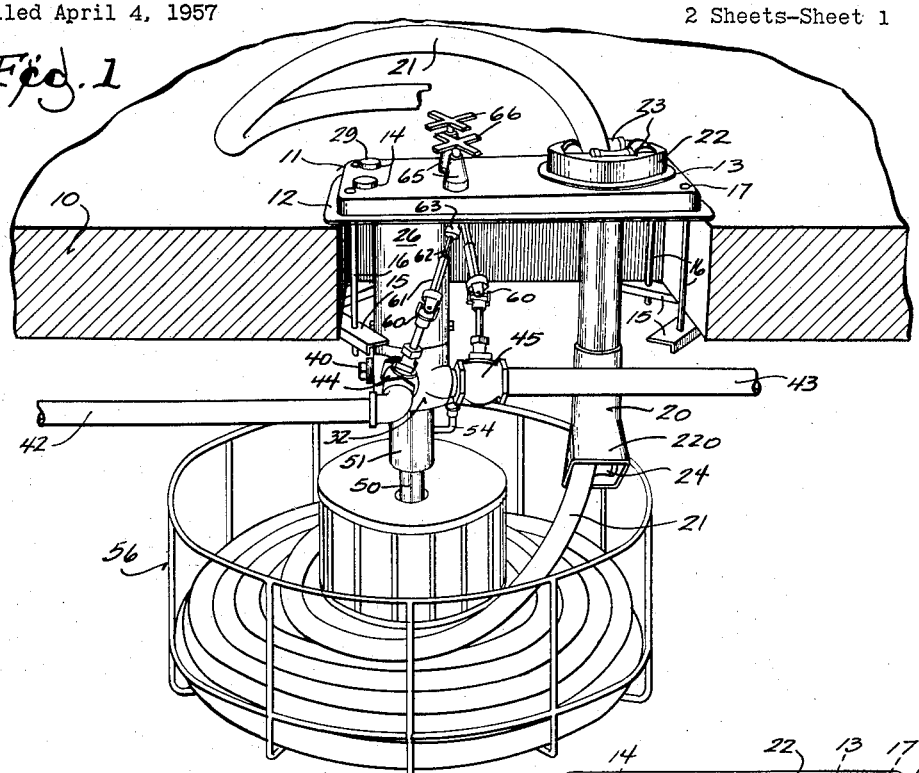
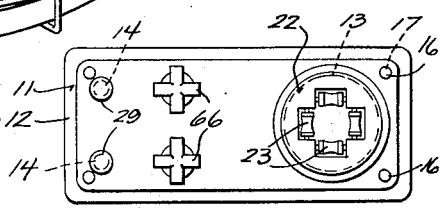
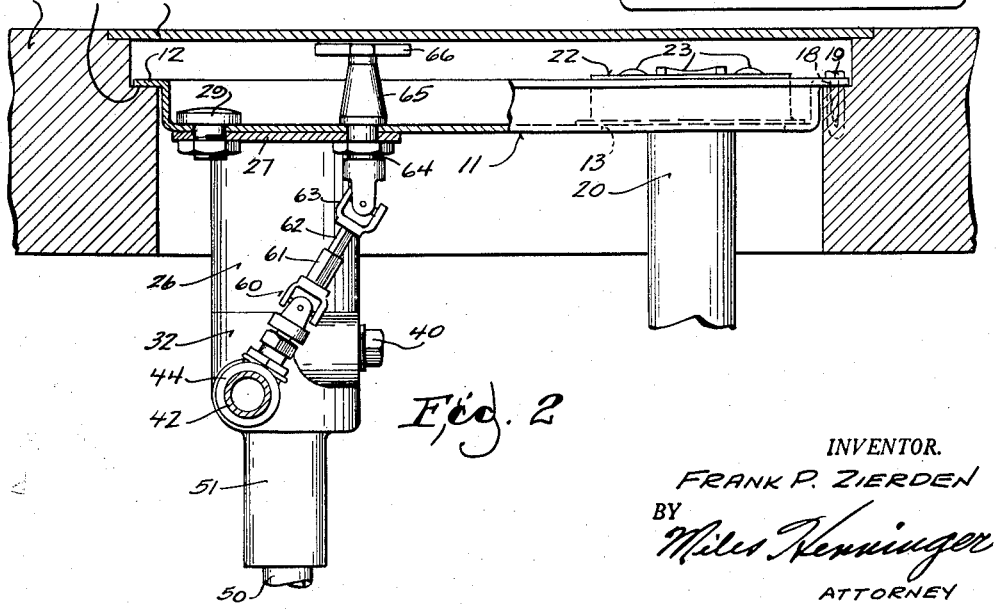
INVENTOR.
FRANK P. ZIERDEN
BY
ATTORNEY Feb. 3, 1959  F. P. ZIERDEN  2,872,246
HOSE REEL MOUNTING
Filed April 4, 1957  2 Sheets-Sheet 2
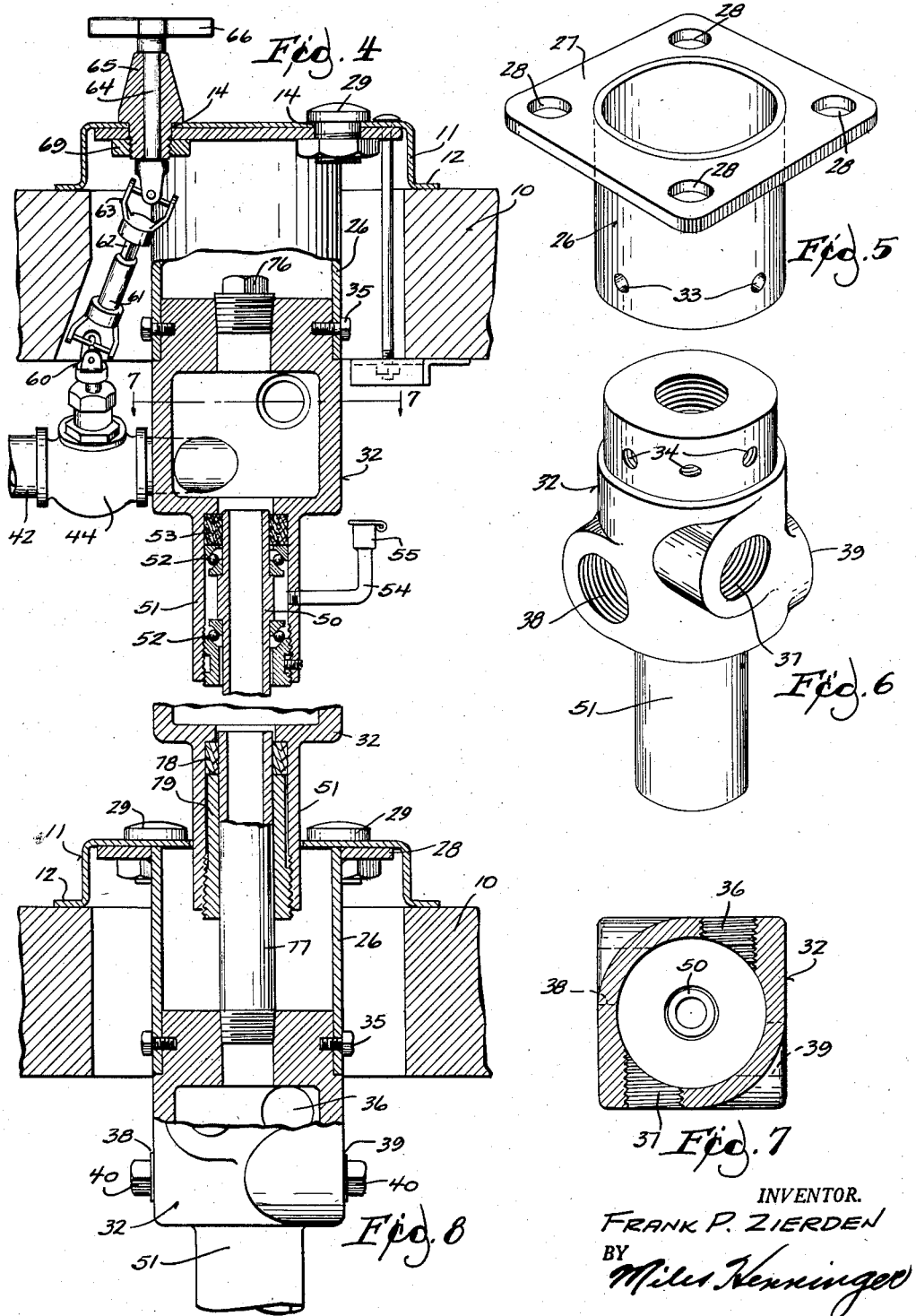
INVENTOR.
FRANK P. ZIERDEN
BY
Miles Henninger
ATTORNEY

United States Patent Office 2,872,246
Patented Feb. 3, 1959

2,872,246

HOSE REEL MOUNTING

Frank P. Zierden, Cudahy, Wis.

Application April 4, 1957, Serial No. 650,611

7 Claims. (Cl. 299—78)

This invention relates to improvements in reels for storing hose in a space which may be a space other than that in which the hose is to be used, while keeping the hose fully accessible for use anywhere in the latter space.

In many buildings it is desirable to maintain a hose ready for instant use without substantially encumbering the space in which the hose is to be used, i. e. in the corridors of public buildings, in dairies and other food-processing plants, and the like. The hose should be carried on a rotatable reel so that any or all of its length may be used, and should be returnable to the reel merely by pushing on the hose. In most cases the hose nozzle and the handles of the valve controlling flow through the hose may be visible from the "use" space as distinguished from the "storage" space. However, in some locations it is required that even the nozzle and the valve control handles be concealed, which is particularly true when a number of valves severally control a plurality of the fluids to be mixed just before reception of the mixed fluids by the hose.

The entire structure of such semi-concealed or fully concealed hose reel mounting should be adaptable to mounting on horizontal building surfaces such as floors or on vertical surfaces such as side walls, with no change whatever in parts and regardless of the location in which the mounting is to be placed. The simplesst possible chamber should be provided for connection with a number of pipes to secure the thorough mixing of the separate fluids and the mixing chamber should be adjustable rotationally for the most direct possible connection with the fluid supply pipes. The mixing chamber member should support a hollow shaft for delivery of the mixture to the hose without leakage but also without producing substantial resistance to rotation of the shaft and the reel mounted thereon. It is desirable that the entire mounting be such that a relatively small opening will accommodate the mixing chamber member, the handles for the valves controlling flow of fluids in a number of pipes and means for guiding the hose in both its withdrawal from and return to the reel.

It is one object of the present invention to provide a mounting for a hose reel and hose and for supporting the hose nozzle and the handles of a control valve or valves, in which the parts require no change whether the reel is mounted on a horizontal or a vertical surface and whether the nozzle and the handles are to be semi-concealed or fully concealed with respect to the space in which the hose is to be used.

Another object of the invention is to provide a mounting for a hose reel and hose in which a part of the mounting itself serves as a simple and effective chamber for mixing a number of fluids and serves also as a support for the hose reel spindle and in which the various parts are so joined as to be easily adaptable to rotational placing of the mixing chamber member for simplifying connections with pipe lines for various fluids.

Another object of the invention is to provide a single plate of minimum size for supporting a mounting for a rotatable hose reel and hose and for supporting both the hose nozzle and the valve handle or valve handles in adjacent relationship and in which a different space relationship of some of the parts provides an installation with the hose nozzle and control valve handles extending beyond the surface of a building wall or with the hose nozzle and control valve handles retained within an opening in a building wall.

Another object of the invention is to provide a mounting for a rotatable hose reel and a hose permanently connected with a fluid supply pipe forming a part of the reel, and in which some of the parts serve both for protecting and bearing the control valve handles and for, at least in part, attaching the reel in overhung relation from a base plate.

Advantages and objects other than those above set forth will be apparent from the following description when read in connection with the accompanying drawing in which:

Fig. 1 is a vertical elevation of the present mounting in and on a horizontal surface and with the hose nozzle and control valve handles not concealed but extending into the space in which the hose is to be used;

Fig. 2 is an enlarged fragment of portions of the structure shown in Fig. 1 when such portions are to be used to provide an installation fully concealed with respect to the space in which the hose is to be used;

Fig. 3 is a top plan view of a plate for supporting and bearing the handles of the control valve and for bearing and guiding the hose in its withdrawal from and return to the reel;

Fig. 4 is a view partially in elevation and partially in section and particularly showing the means for adjusting the position of the mixing chamber and for supporting the hose reel shaft by the mixing chamber member;

Fig. 5 is a perspective view of a connector member supporting a mixing chamber member and so placing the latter as to simplify connection of the fluids supply piping;

Fig. 6 is a perspective view of a mixing chamber member;

Fig. 7 is a cross-sectional view on the line 7—7 of Fig. 4; and

Fig. 8 is a view partially in elevation and partially in section to show a mixing chamber ahead of the means for supporting the hose reel shaft when control of fluids flow and any mixing can be done otherwise than as a part of the reel mounting.

Referring to the drawings by reference numerals, 10 designates a horizontal surface such as a building floor under which is to be suspended the major portion of the present hose reel mounting, to provide a semi-concealed installation with respect to the space above the floor. An opening through the floor 10 is covered by a rectangular base plate 11 which is dished or recessed and has a peripheral flange 12. The plate is formed with one relatively large opening 13 (see Fig. 3) adjacent one end of the plate and with a series of smaller openings 14 arranged at the corners of a square of considerable size and adjacent the other end of the plate, two of the openings 14 being visible and the other two openings being filled by other parts. In a semi-concealed installation, bars 15 are connected with the plate 11 by bolts 16 through holes 17 in plate 11, the bars extending across corners of the floor opening and holding the structure firmly in place when the bolts are drawn up. When a concealed installation is to be made as shown in Fig. 2, the flange of base plate 11 is provided with holes 18 to receive anchor screws 19 or the like as substitutes for bolts 16. Thus it is necessary only to provide a single opening in a floor or other building wall. If the present mounting is to be placed in a vertical wall, a base plate similar to that shown in Fig. 3 may be used and brackets are then provided with holes registering with the base plate holes 18.

The opening 13 in the base plate receives a tube 20 through which a hose 21 moves as it is drawn out of the reel for use and returned to the reel after use. A frame 22 is fixed about the opening 13 and supports rollers 23 arranged in a square to provide a roller for carrying the hose regardless of the angle at which the hose moves through the guide means 20, 23. Rollers 24 are also provided at the rectangular portion of guide 220 to act with the curving of such tube portion in bending the hose from vertical toward horizontal and laterally for easy coiling in a reel.

The openings 14 through the base plate are spaced to register with openings in a connector member and for attachment of such connector to the base plate. The connector is in the form of a short heavy-walled tube 26 with a flange 27 at one end and having four holes 28 (see Fig. 5) registrable with the holes 14 in the base plate so that the connector can be attached to the base plate by bolts 29 or other parts passing through the registering holes. The connector 26—28 receives one end of a tubular member 32 and the connector has a number of holes 33 registrable with threaded holes 34 in the member 32 for joining the same to the connector by means such as screws 35. There are a sufficient number of holes 33 and 34 so that the member 32 may be rotated in steps of a number of degrees each in either direction relative to the connector tube while providing a secure joint between them.

The member 32 has two pairs 36, 37 and 38, 39 of threaded inlet holes with each pair at a different level longitudinally of the member. The holes of each pair are spaced approximately 180° around the mixing chamber member and severally open into such chamber substantially tangentially to its interior surfaces. Thus two fluids to be mixed may be delivered by one pair of holes and the streams of such fluids will cross and will co-act in securing adequate mixture. If more than two fluids are to be mixed, one or both of the other pair of holes may be used to secure thorough mixing of a third and/or fourth fluid with the first two fluids. Any inlets 36—39 which are not in use are closed by suitable plugs 40.

When a number of supply pipes are to be connected to the mixing chamber member 32 as indicated at 42 and 43, the mixing chamber member is rotated relative to the connector tube 26—29 to the location giving the simplest supply piping and is then firmly joined with the connector by the screws 35 in all of the holes 33, 34 which are then in registry. The flow of fluids through the pipes 42, 43 is controlled by a usual form of valve indicated at 44 and 45 of the type having a rotatable stem.

Fluid is delivered from the mixing chamber member 32 through a hollow shaft 50 journalled in an extension 51 from the mixing chamber member. The shaft 50 is supported in the mixing chamber extension 51 by bearings 52 and is sealed in fluid type relation with such extension by packings 53 to which lubricant is supplied by way of tube 54 and cup 55. The shaft 50 carries a basket type reel 56 and is connected permanently with the hose 21. Hence, any fluid flowing through the shaft is delivered to the hose whether all of the hose is drawn off the reel or the hose is left partially on the reel.

Fig. 1 shows a construction in which only two fluids are to be supplied by way of the pipe lines 42 and 43 under control of the valves 44 and 45. Each of the valves is operated by a telescoping connection with its valve stem and comprising a universal joint 60 connected at one side with the valve stem and bearing a tube 61 on the other side. The tube 61 has a square or other angular internal cross-section to receive a rod 62 of similar cross-section in easy sliding relation for rotating the tube when the rod is rotated but permitting telescoping of the tube and rod. Another universal joint 63 is connected at one side with the rod 62 and is connected also to a stem 64. The stem 64 extends through a column 65 and has a handwheel 66 at the end thereof for rotation of the valve connecting linkage whereby the valves are adjusted. The column 65 extends through one of the holes 14 in the base plate 11 and through one of the holes 28 in the connector flange and is fixed in position by a nut 69 so that the column serves both to locate the stem 64 and to hold the connector, etc. to the base plate.

When a fully concealed installation is to be made as shown in Fig. 2, the opening in a floor 10 or other building wall is formed with an internal shoulder 72. When the opening is in a floor, the base plate 11 is reversed and the flange of the base plate rests on the shoulder 72, reversal of the plate providing sufficient space for the valve handle columns and handles and for the nozzle guide frame and nozzle between the base plate and another plate or door 73 which may be laid into the floor or hung on the wall. When a concealed installation is to be made in a vertical wall, bars and bolts may be used as shown in Fig. 1. Thus it will be seen that all or a part of the same parts may be used without any change whatever in the two kinds of installations.

When it is possible to use control valves in the piping within the space where the hose is to be used, the valve stem extensions described above need not be used and the base plate serves as a support only for the connector, etc. as shown in Fig. 8. Plug 76 (see Fig. 4) is then removed and a single supply pipe 77 is then extended through a hole in the base plate 11 and through the connector 26, 28 and is threaded into the opening from which the plug was removed. The mixing chamber holes 36—39 are all closed by plugs 40. If a mixing of fluids is desired, a second mixing chamber member 32—40 can be inserted in the supply pipe 77 and can be connected with the mixing chamber shown in Fig. 8, by a packing gland comprising packing 78 and a follower nut 79.

The present mounting has many advantages over other constructions offered for the same purpose. The mounting can be used in either a horizontal or vertical surface by use of the same parts. A wholly concealed arrangement can be made using only different base plate fasteners and adding a cover plate flush with the wall or floor. Only a few parts are in the "use" space so that obstructions to full use of such space are kept at a minimum. The parts extending into the use space are simple in shape for easy cleaning and have high finishing as by plating to conform in appearance with other equipment when used in a food-processing plant. The mixing chamber and reel spindle supporting member gives thorough mixing of up to four fluids in a small and simple member which has a heavy wall to stand high pressures applied to or produced by mixing the fluids and to resist erosion by the fluids. The mixing chamber is rotatable relative to the support and is firmly connected with the support by simple means. The mixing chamber member extension supports the spindle in a way to allow packing replacement, and removal and replacement of bearings and spindle without disturbing any other mounting parts.

Although but two embodiments of the present invention have been illustrated and described, it will be apparent to those skilled in the art that various changes and modifications may be made therein without departing from the spirit of the invention or from the scope of the appended claims.

I claim:

1. In a mounting for a rotatable reel receiving a hose and for permanent connection of the hose to pipes severally supplying a fluid under control of valves, the reel being on one side of a building wall and the hose extending through an opening to the other side of the wall, a base plate for substantially closing the wall opening, a guide tube supported in the plate for movement of the hose therethrough and through the wall, a connector tube supported on the plate, a tubular member attached to the connector tube and providing a chamber for receiving a plurality of fluids from the pipes, the tubular member being rotationally adjustable relative to the connector, valves for controlling the flow of fluids to the tubular member chamber and having valve-operating handles extending therefrom, a hollow spindle rotatable in the tubular member in fluid-tight relation therewith for supporting the reel, the spindle receiving fluid from the tubular member and delivering fluid to the hose, said hose being connected with the spindle, and columns mounted on the plate, receiving the valve handles, and serving for attaching the connector tube to the plate.

2. In a mounting for a rotatable reel receiving a hose and for permanent connection of the hose to pipes severally supplying a fluid under control of valves, the reel being on one side of a building wall and the hose extending through an opening to the other side of the wall, a base plate for substantially closing the wall opening, the base plate having a recessed portion and a peripheral flange and having holes in the recessed portion in a given pattern, a guide tube supported in the plate for movement of the hose therethrough and through the wall, a connector tube supported on the base plate, the connector tube having a flange with holes registering with the pattern of holes in the base plate, a tubular member attached to the connector tube and providing a chamber for receiving a plurality of fluids from the pipes, valves for controlling the flow of fluids to the tubular member chamber and having valve-operating handles extending therefrom, a hollow spindle rotatable in the tubular member in fluid-tight relation therewith for supporting the reel, the spindle receiving fluid from the tubular member and delivering fluid to the hose, said hose being connected with the spindle, and columns mounted on the plate, receiving the valve handles, and serving for attaching the connector tube to the plate.

3. In a mounting for a rotatable reel receiving a hose and for permanent connection of the hose to pipes severally supplying a fluid under control of valves, the reel being on one side of a building wall and the hose extending through an opening to the other side of the wall, a base plate for substantially closing the wall opening, a guide tube supported in the plate for movement of the hose therethrough and through the wall, a frame mounted on the base plate about the end of the guide tube, rollers in the frame defining an opening for movement of the hose therethrough, a connector tube supported on the plate, a tubular member attached to the connector tube and providing a chamber for receiving a plurality of fluids from the pipes, valves for controlling the flow of fluids to the tubular member chamber and having valve-operating handles extending therefrom, a hollow spindle rotatable in the tubular member in fluid-tight relation therewith for supporting the reel, the spindle receiving fluid from the tubular member and delivering fluid to the hose, said hose being connected with the spindle, and columns mounted on the plate, receiving the valve handles, and serving for attaching the connector tube to the plate.

4. In a mounting for a rotatable reel receiving a hose and for permanent connection of the hose to pipes severally supplying a fluid under control of valves, the reel being on one side of a building wall and the hose extending through an opening to the other side of the wall, a base plate for substantially closing the wall opening, a guide tube supported in the plate for movement of the hose therethrough and through the wall, a connector tube supported on the plate, a tubular member attached to the connector tube and providing a chamber and having a plurality of openings at different locations along the axis of and around the member for receiving a plurality of fluids from the pipes, valves for controlling the flow of fluids to the tubular member chamber and having valve-operating handles extending therefrom, a hollow spindle rotatable in the tubular member in fluid-tight relation therewith for supporting the reel, the spindle receiving fluid from the tubular member and delivering fluid to the hose, said hose being connected with the spindle, and columns mounted on the plate, receiving the valve handles, and serving for attaching the connector tube to the plate.

5. In a mounting for a rotatable reel receiving a hose and for permanent connection of the hose to pipes severally supplying a fluid under control of valves, the reel being on one side of a building wall and the hose extending through an opening to the other side of the wall, a base plate for substantially closing the wall opening, a guide tube supported in the plate for movement of the hose therethrough and through the wall, a connector tube supported on the plate, a tubular member attached to the connector tube and providing a cylindrical chamber having pairs of openings tangentially into the chamber and at different locations along the axis of the chamber for receiving a plurality of fluids from the pipes, valves for controlling the flow of fluids to the tubular member chamber and having valve-operating handles extending therefrom, a hollow spindle rotatable in the tubular member in fluid-tight relation therewith for supporting the reel, the spindle receiving fluid from the tubular member and delivering fluid to the hose, said hose being connected with the spindle, and columns mounted on the plate, receiving the valve handles, and serving for attaching the connector tube to the plate.

6. In a mounting for a rotatable reel receiving a hose and for permanent connection of the hose to pipes severally supplying a fluid under control of valves, the reel being on one side of a building wall and the hose extending through an opening to the other side of the wall, a base plate for substantially closing the wall opening, a guide tube supported in the plate for movement of the hose therethrough and through the wall, a connector tube supported on the plate, a tubular member attached to the connector tube and providing a chamber for receiving a plurality of fluids from the pipes, the tubular member having a tubular extension, valves for controlling the flow of fluids to the tubular member chamber and having valve-operating handles extending therefrom, a hollow spindle mounted in the tubular extension and having external shoulders thereon, bearings seated on the shoulders and movable axially in the extension, packing pressed on the tubular member and on the spindle by pressure transmitted through the bearings, the spindle receiving fluid from the tubular member and delivering fluid to the hose, said hose being connected with the spindle, and columns mounted on the plate, receiving the valve handles, and serving for attaching the connector tube to the plate.

7. In a mounting for a rotatable reel receiving a hose and for permanent connection of the hose to pipes severally supplying a fluid under control of valves, the reel being on one side of a building wall and the hose extending through an opening to the other side of the wall, a base plate for substantially closing the wall opening, a guide tube supported in the plate for movement of the hose therethrough and through the wall, a connector tube supported on the plate, a tubular member attached to the connector tube and providing a chamber for receiving a plurality of fluids from the pipes, the tubular member having an internally threaded tubular extension therefrom, a hollow spindle rotatable in the extension and having external shoulders thereon, ball-bearings seated on the shoulders and movable axially of the extension, the raceways of one of the bearings being threaded into the extension and retained in given position, packing pressed on the tubular member and on the spindle by pressure exerted through the bearings and the spindle, the hose being connected with the spindle, and columns mounted on the plate, receiving the valve handles, and serving for attaching the connector tube to the plate.

References Cited in the file of this patent
UNITED STATES PATENTS

| | | |
|---|---|---|
| 2,339,901 | Zierden | Jan. 25, 1944 |
| 2,627,074 | Karp | Feb. 3, 1953 |
| 2,707,467 | Pelzer et al. | May 3, 1955 |